(12) United States Patent
Shukla

(10) Patent No.: US 6,372,220 B1
(45) Date of Patent: Apr. 16, 2002

(54) FENUGREEK IMPREGNATED MATERIAL FOR THE PRESERVATION OF PERISHABLE SUBSTANCES

(76) Inventor: Kavita Shukla, 10423 Popkins Ct., Woodstock, MD (US) 21163

( * ) Notice: Subject to any disclaimer, the term of this patent is extended or adjusted under 35 U.S.C. 154(b) by 0 days.

(21) Appl. No.: 09/776,149

(22) Filed: Feb. 5, 2001

(51) Int. Cl.7 .............................................. A61K 35/78
(52) U.S. Cl. .................... 424/195.1; 424/725; 424/773; 424/774; 424/775; 424/776; 424/777
(58) Field of Search .............................. 424/725, 773, 424/774, 775, 776, 777, 778, 779

(56) References Cited

U.S. PATENT DOCUMENTS

| 3,648,428 A | * | 3/1972 | Colburn |
| 5,859,293 A | * | 1/1999 | Bailey et al. |
| 5,997,877 A | * | 12/1999 | Chang |
| 6,001,396 A | * | 12/1999 | Bayer et al. |
| 6,013,304 A | * | 1/2000 | Todd |

FOREIGN PATENT DOCUMENTS

| AU | 1992-407565 | * | 10/1992 |
| JP | 357 170 176 A | * | 10/1982 |
| JP | 410 280 299 A | * | 10/1998 |

OTHER PUBLICATIONS

Prasad et al., "Effect of spices on the growth of red halophilic cocci isolated from salt cured fish and solar salt", Food Research International, 2000, vol.33, No.9, pp. 793–798.*

\* cited by examiner

*Primary Examiner*—Leon B. Lankford, Jr.
*Assistant Examiner*—Ruth A Davis

(57) ABSTRACT

The present invention to a material that is coated with or soaked in a suspension of a botanical extract such that particles of said natural botanical extract are in contact with, embedded on, or embedded within the material. The present invention can be used to preserve perishable substances such as edible substances or foods by extending their freshness, shelf life or suitability for consumption by living organisms. Botanical extracts suitable for the present invention include botanical extracts that have anti-bacterial, anti-fungal, anti-viral or other preventative or curative properties. The botanical extract coated material described in the present invention is suitable for applications such as the packaging and preservation of perishable substances such as fruits and vegetables, meat products, dairy products, edible substances, non-edible substances and other perishable substances. Specifically, the material is impregnated with an extract of Fenugreek (*Trigonella foenum-graecum*).

24 Claims, 2 Drawing Sheets

FENUGREEK IMPREGNATED MATERIAL FOR THE PRESERVATION OF PERISHABLE SUBSTANCES

FIELD OF THE INVENTION

The present invention relates to a material that is coated with or soaked in a suspension of a botanical extract such that particles of said natural botanical extract are in contact with, embedded on, or embedded within the material. The present invention can be used to preserve perishable substances such as edible substances or foods by extending their freshness, shelf life or suitability for consumption by living organisms. Botanical extracts suitable for the present invention include botanical extracts that have anti-bacterial, anti-fungal, anti-viral or other preventative or curative properties. The botanical extract coated material described in the present invention is suitable for applications such as the packaging and preservation of perishable substances such as fruits and vegetables, meat products, dairy products, edible substances, non-edible substances and other perishable substances.

BACKGROUND OF THE INVENTION

Perishable edible substances such as fruits and vegetables are subject to spoilage during growth and ripening, while they are being transported and when they are placed on the shelves at retail outlets such as grocery stores. Thus, from the farming process to the retail of many foods, significant losses are often incurred by the spoilage of significant proportions of a given sample of a food type. This can result in significant losses to farmers, distributors and retailers and even result in food shortages in regions or countries where food is scarce. Currently a number of chemicals, waxes and other synthetic products are used to spray, coat or cover perishable foods to prevent or delay the onset of spoilage. Washing fruits and vegetables with certain chemicals such as antibacterial chemicals or sulfur can slow down the spoilage process. Fruits and vegetables are also subject to infestation by insects and other natural predators and a number of chemicals and synthetic insecticides are currently used to preserve fruits and vegetables during the growing stages. For many other foods, preservatives are added to the food itself to prevent spoilage.

Yet, many of the currently used methods are not suitable for all types of foods such as fruits and vegetables and many of the currently used preservatives, insecticides and other preservation methods are not always effective in preventing spoilage for sufficient time periods. Furthermore, chemicals and toxins used for preservation can seep into foods such as fruits and vegetables and the chemicals and toxins can often not be sufficiently removed when such foods are prepared for consumption by living organisms. This presents toxicity concerns for consumers. The market for organic foods has grown significantly in recent years as consumers seek to obtain foods that are free of chemicals and other toxins. Therefore, there is a strong need for non-toxic, natural agents that are effective in preventing spoilage of edible foods and that hold anti-bacterial, anti-fungal and insecticidal properties. Perishable substances, as described in the present invention, also include non-edible perishable substances such as therapeutic botanical substances.

The botanical extract-coated material described in the present invention presents many advantages over currently available tools and methods for preserving perishable substances. In the present invention many different materials can be used in combination with a variety of botanical extracts from plants of different species. For example, paper or cardboard can be coated with an extract from the seeds of fenugreek (*trigonella foenum-graecum*). Fenugreek has anti-bacterial and anti-fungal properties and is effective in preventing the growth of pathogens. Thus, when foods, such as strawberries, are placed on wrapped in the fenugreek-coated paper, their freshness is preserved for a longer period of time since pathogens such as bacteria and fungi do not grow as easily on their surface. The foods can be placed in contact with the material containing the botanical extract in any configuration that is suitable for reducing the spoilage of such foods. Botanical extracts such as fenugreek can also have applications such as preventing the proliferation of pathogens in applications such as tissue culturing.

ADVANTAGES OF THE INVENTION

The botanical extract coated material described in the present invention offers a number of advantages over currently available methods because it:

presents low or no toxicity risks, depending on the type of botanical extract used;

provides a safe, natural alternative for the preservation of perishable substances;

can be easily prepared with botanical extracts such as fenugreek extracts;

can be developed for different types of perishable food packaging and holding applications; and, can be developed for large-scale production.

Various features of novelty that characterize the present invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which.

DESCRIPTION OF THE PREFERRED EMBODIMENTS

Figure 1:
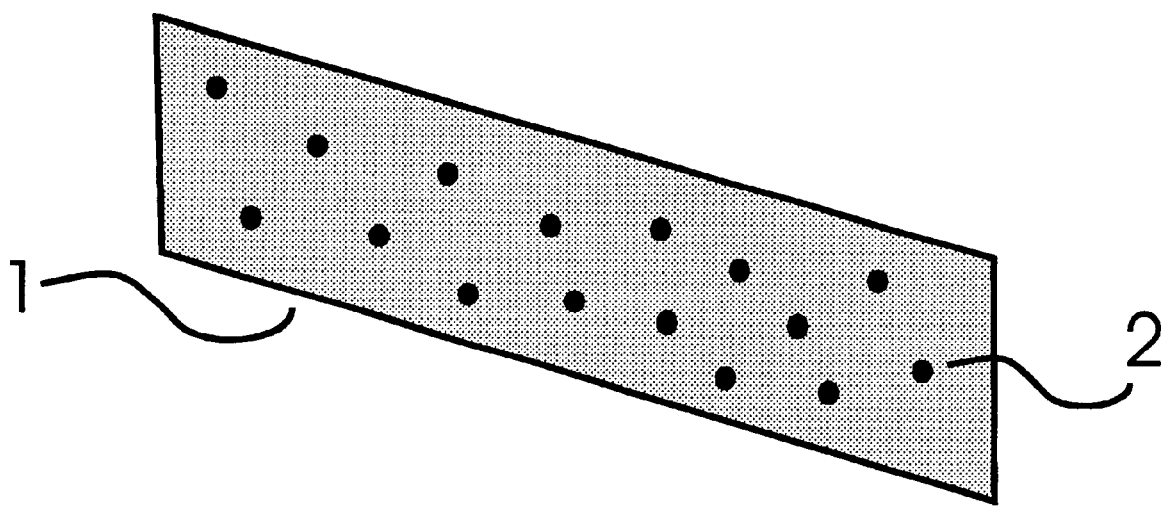
FIG. 1 is an expanded view of one embodiment of a material with particles of a botanical extract embedded on it, according to the present invention.

Referring to the drawings, FIG. 1 shows a material (1), in this instance a sheet of paper used to wrap fruit, which is coated with particles of a botanical extract (2). The material (1) can consist of at least one type of material selected from the group comprised of, but not limited to, paper, cardboard, paper products, paper derivatives, shredded paper, pulp, wood, cotton, tree bark, leaves, grass, plant materials, synthetic paper, synthetic sheets, synthetic polymers, plastic, metal, natural wax, glass, ceramic, porcelain, synthetic wax, natural foam, synthetic foam and combinations thereof. While the material (1) is shown in a flat sheet configuration in FIG. 1, it is understood that the material (1) can be part of a form selected from the group comprised of a box, a container, a holding device, a bottle, a jar, a rectangular shape, a circular shape, a sheet shape, a spherical shape, a cylindrical shape, a cubical shape, a conical shape, a spheroid shape, an irregular shape, a wrapping material, a holding material, a padding material, a filling material and combinations thereof.

The botanical extract (2) can consist of any type of botanical extract, where a botanical extract is defined as a component derived from a part of a species that is a member of the plant kingdom. Thus, said botanical extract can be derived from a botanical source selected from the group comprised of plants, trees, saplings, seeds, seed coverings, barks, stems, leaves, flowers, roots, pollen, nuts, gall nuts, sap, tree sap, flower sap, flower nectar and combinations thereof.

The botanical extract (2) can be obtained from a single botanical component, such as the fenugreek (trigonella foenum gracum) seed, or it can be obtained from a combination of different types of plants or plant species. Thus said botanical extract can be comprised of combinations of different types of botanical extracts from different types of plants. For example, said botanical extract can be selected from the group comprised of a fenugreek component selected from the group comprised of fenugreek seed, fenugreek seed extract, fenugreek leaf, fenugreek stem, fenugreek sapling, fenugreek plant, fenugreek root and combinations thereof. For example paper embedded with particles of fenugreek (trigonella foenum graecum) can be prepared by different methods as described below:

- coating or soaking the paper in an aqueous suspension of fenugreek seed powder whole fenugreek seeds or a combinations thereof;
- coating or soaking of the paper in an organic solvent suspension of fenugreek seed powder whole fenugreek seeds or combinations thereof;
- adding fenugreek seed powder to the paper during the manufacturing process; and
- adding fenugreek seed powder or an organic or aqueous extract of fenugreek powder or seeds to the paper pulp during the paper manufacturing process.

The botanical extract (2), as described in the present invention, holds properties that enhance the preservation of edible substances such as fruits and vegetables. Thus, said botanical extract has at least one property selected from the group comprised of anti-bacterial properties, anti-fungal properties, anti-viral properties, bacterial proliferation inhibition properties, viral proliferation inhibition properties, fungal proliferation inhibition properties, insect-repelling and insecticidal properties. While the term botanical extract is used in the present invention, it is understood that an extract means any derivative of a botanical product, where said derivative is selected from the group comprised of derivatives of purified botanical products, derivatives of unpurified botanical products, derivatives of processed botanical products, derivatives of unprocessed botanical products and combinations thereof. Also, said botanical extract (2) can be obtained by a means selected from the group comprised of aqueous solution extraction, non-aqueous solution extraction, organic solvent extraction, non-organic solvent extraction, pH variation based extraction, chromatography separation, crude extraction refined extraction and combinations thereof.

Figure 2:
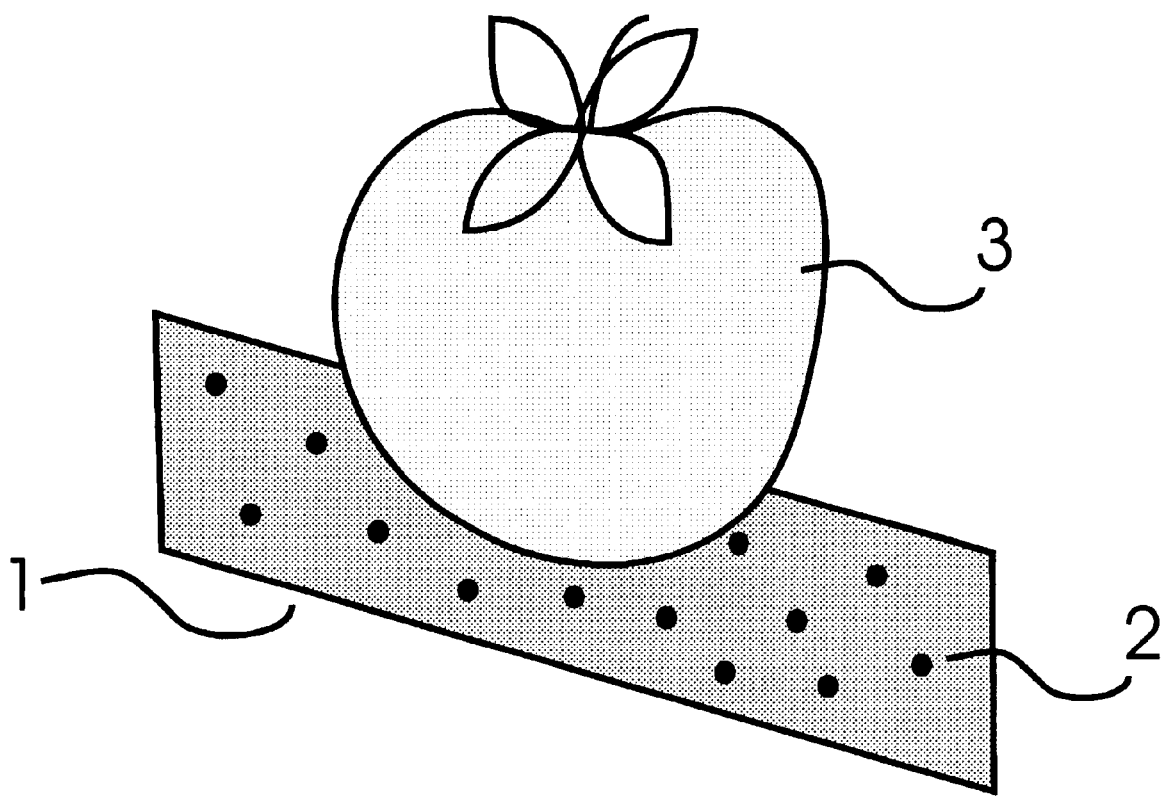
FIG. 2 is an expanded view of one embodiment of a fruit placed on a material with particles of a botanical extract embedded on it, according to the present invention.

FIG. 2 shows an edible substance (3), in this instance a strawberry, which has been placed on a material with particles of a botanical extract embedded on. it. In the present invention the term perishable substances means any substances liable to decay or deterioration; and, the terms edible substance, perishable food and foods are used interchangeably to indicate any edible item that is suitable for ingestion, absorption or consumption by a living organism. Thus, said perishable substance (3) can be selected from the group comprised of, but not limited to, food, edible substances, non-edible substances, therapeutic substances, fruits, vegetables, grain products, meat products, eggs, dairy products, perishable products and combinations thereof.

The means of preserving the edible substance (3), as described in the present invention, can be any means selected from the group comprised of extending the freshness of said perishable substances; extending the shelf life of said perishable substances; preventing insect infestation of said perishable substances; ameliorating insect infestation of said perishable substances; preventing bacterial infection of said perishable substances; ameliorating bacterial infection of said perishable substances; preventing fungal infection of said perishable substances; ameliorating fungal infection of said perishable substances; preventing viral infection of said perishable substances; ameliorating viral infection of said perishable substances and combinations thereof. The broader usefulness of the invention may be illustrated by the following example.

Example 1

Preserving Fruit By the Use of Fenugreek Coated Paper

A fenugreek extract was prepared by grinding 10 g of fenugreek seeds and soaking the resulting powder in 100 mL water. A soft sheet of paper was soaked in the resulting solution for 2 hours and the sheet was then dried overnight. One strawberry was wrapped in the fenugreek treated paper and kept in an incubator at 25° C. for 120 hours. A different strawberry was wrapped in soft paper soaked in distilled water and dried overnight. This sample was also placed in an incubator at 25° C. for 120 hours. Observations every 12 hours showed that the strawberry wrapped in the water soaked paper showed significant signs of spoilage after 24 hours while the strawberry soaked in the fenugreek coated paper showed no signs of spoilage until after 120 hours or a longer period of time. Signs of spoilage included growth of bacteria and fungi on the surface of the fruit and loss of natural, fresh color of the fruits.

While a specific embodiment of the invention has been shown and described in detail to illustrate the application of the principles of the invention, it will be understood that the invention may be embodied otherwise without departing from such principles and various modifications, alternate constructions, and equivalents will occur to those skilled in the art given the benefit of this disclosure. Thus, the invention is not limited to the specific embodiment described herein, but is defined by the appended claims.

SUMMARY OF THE INVENTION

The present invention relates to a material that is coated with or soaked in a suspension of a botanical extract such that particles of said natural botanical extract are in contact with, embedded on, or embedded within the material. The present invention can be used to preserve perishable substances such as edible substances or foods by extending their freshness, shelf life or suitability for consumption by living organisms. Botanical extracts suitable for the present invention include botanical extracts that have anti-bacterial, anti-fungal, anti-viral or other preventative or curative properties. The botanical extract coated material described in the present invention is suitable for applications such as the packaging and preservation of perishable substances such as fruits and vegetables, meat products, dairy products, edible substances, non-edible substances and other perishable substances.

What is claimed is:

1. A composition of matter comprising a material impregnated with a fenugreek extract wherein said material is in contact with a perishable substance.

2. The composition of claim 1 wherein said material is selected from the group consisting of paper, cardboard, paper products, paper derivatives, pulp, wood, cotton and combinations thereof.

3. The composition of claim 2 wherein said material is a container, storage device or holding device in any shape and size.

4. The composition of claim 1 wherein said fenugreek extract is derived from multiple parts of a fenugreek plant (*Trigonelea foenum-graecum*).

5. The composition of claim 1 wherein said fenugreek extract exhibits at least one property selected from the group consisting of antibacterial, antifungal, antiviral, insecticidal and insect repellent.

6. The composition of claim 1 wherein said fenugreek extract exhibits inhibition of bacterial proliferation, viral proliferation, or fungal proliferation.

7. The composition of claim 1 wherein said fenugreek extract is selected from the group consisting of purified fenugreek extract, unpurified fenugreek extract, processed fenugreek extract, unprocessed fenugreek extract, and combinations thereof.

8. The composition of claim 1 wherein said fenugreek extract is derived from a component selected from the group consisting of fenugreek seed, fenugreek seed extract, fenugreek leaf, fenugreek stem, fenugreek sapling, fenugreek plant, fenugreek root, parts thereof and combinations thereof.

9. The composition of claim 1 wherein said fenugreek extract is derived from an aqueous solutions extraction, non-aqueous solutions extraction, organic solvent extraction, non-organic solvent extraction, pH variation based extraction, chromatography separation, crude extraction, refined extraction, or combinations thereof.

10. The composition of claim 1 wherein said perishable substance is edible.

11. The composition of claim 10 wherein said edible substance is selected from the group consisting of fruit, vegetables, grain, grain products, meat, meat products, eggs, dairy products and combinations thereof.

12. The composition of claim 1 wherein said material exhibits an activity selected from the group consisting of extending freshness, extending shelf life, preventing insect infestation, ameliorating insect infestation, preventing bacterial infection, ameliorating bacterial infection, preventing fungal infestation, ameliorating fungal infestation, preventing viral infection, ameliorating viral infection and combinations thereof, on said perishable substance.

13. A method for preserving a perishable substance comprising contacting said perishable substance with a material impregnated with fenugreek extract.

14. The method of claim 13 wherein said material is selected from the group consisting of paper cardboard, paper products, paper derivatives, pulp, wood, cotton and combinations thereof.

15. The method of claim 14 wherein said material is a container, storage device or holding device in any shape or size.

16. The method of claim 13 wherein said fenugreek extract is a derived from multiple parts of a fenugreek plant (*Trigonella foenum-graecum*).

17. The method of claim 13 wherein said fenugreek extract exhibits at least one property selected from the group consisting of antibacterial, antifungal, antiviral, insecticidal and insect repellant.

18. The method of claim 13 wherein said fenugreek extract exhibits inhibition of bacterial proliferation, viral proliferation, or fungal proliferation.

19. The method of claim 13 wherein said fenugreek extract is selected from the group consisting of purified fenugreek extract, unpurified fenugreek extract, processed fenugreek extract, unprocessed fenugreek extract, and combinations thereof.

20. The method of claim 13 wherein said fenugreek extract is derived from a component selected from the group consisting of fenugreek seed, fenugreek seed extract, fenugreek leaf, fenugreek stem, fenugreek sapling, fenugreek plant, fenugreek root, parts thereof and combinations thereof.

21. The method of claim 13 wherein said fenugreek extract is derived from an aqueous solutions extraction, non-aqueous solutions extraction, organic solvent extraction, non-organic solvent extraction, pH variation based extraction, chromatography separation, crude extractions, refined extraction, or combinations thereof.

22. The method of claim 13 wherein said perishable substance is edible.

23. The method of claim 22 wherein said edible substance is selected from the group consisting of fruit, vegetables, grain, grain products, meat, meat products, eggs, dairy products and combinations thereof.

24. The method of claim 13 wherein said material exhibits an activity selected from the group consisting of extending freshness, extending shelf life, preventing insect infestation, ameliorating insect infestation, preventing bacterial infection, ameliorating bacterial infection, preventing fungal infestation, ameliorating fungal infestation, preventing viral infection, ameliorating viral infection and combinations thereof, on said perishable substance.

* * * * *